US007596445B2

(12) United States Patent
Maranville et al.

(10) Patent No.: US 7,596,445 B2
(45) Date of Patent: Sep. 29, 2009

(54) METHOD FOR IMPROVING THE OPERATION OF ELECTRICALLY CONTROLLED ACTUATORS FOR AN INTERNAL COMBUSTION ENGINE

(75) Inventors: Clay Maranville, Ypsilanti, MI (US); Larry Elie, Ypsilanti, MI (US); Craig Stephan, Ann Arbor, MI (US); Allan Gale, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 417 days.

(21) Appl. No.: 11/678,721

(22) Filed: Feb. 26, 2007

(65) Prior Publication Data

US 2008/0204178 A1 Aug. 28, 2008

(51) Int. Cl.
*H01F 13/00* (2006.01)
*G06F 19/00* (2006.01)
*F02M 51/00* (2006.01)

(52) U.S. Cl. ..................... 701/104; 251/129.1; 335/284

(58) Field of Classification Search ................. 701/104, 701/101, 102, 103, 105; 123/476, 490; 251/129.1, 251/129.09; 239/96, 88, 90, 92; 335/284
See application file for complete search history.

(56) References Cited

U.S. PATENT DOCUMENTS

| | | | | |
|---|---|---|---|---|
| 5,176,115 | A | | 1/1993 | Campion |
| 5,363,270 | A | * | 11/1994 | Wahba ....................... 361/155 |
| 5,430,601 | A | * | 7/1995 | Burcham .................... 361/154 |
| 5,479,901 | A | | 1/1996 | Gibson et al. |
| 5,494,219 | A | | 2/1996 | Maley et al. |
| 5,515,830 | A | * | 5/1996 | Arakowa .................... 123/490 |
| 5,752,308 | A | | 5/1998 | Maley et al. |
| 5,803,429 | A | | 9/1998 | Tsuzuki et al. |
| 5,954,030 | A | | 9/1999 | Sturman et al. |
| 6,076,508 | A | | 6/2000 | Nakano |
| 6,257,499 | B1 | | 7/2001 | Sturman |
| 6,392,865 | B1 | | 5/2002 | Fochtman et al. |
| 6,575,138 | B2 | | 6/2003 | Welch et al. |
| 6,799,559 | B2 | | 10/2004 | Mieny et al. |
| 6,820,856 | B2 | | 11/2004 | Grill |
| 2004/0011900 | A1 | | 1/2004 | Gebhardt et al. |
| 2005/0263136 | A1 | | 12/2005 | Rigney |

* cited by examiner

*Primary Examiner*—Hieu T Vo
(74) *Attorney, Agent, or Firm*—Allan J. Lippa; Alleman Hall McCoy Russell & Tuttle LLP

(57) ABSTRACT

A method to improve the performance of an electrically operable actuator is described. The method demagnetizes at least the core of an electromagnet to improve operation of the electrically operable actuator.

22 Claims, 8 Drawing Sheets

METHOD FOR IMPROVING THE OPERATION OF ELECTRICALLY CONTROLLED ACTUATORS FOR AN INTERNAL COMBUSTION ENGINE

FIELD

The present description relates to a method for improving the performance of an electrically controlled actuator. The method can improve actuator operation over a range of operating conditions.

BACKGROUND

A method to operate and control one example of an electrically controlled actuator is described in U.S. Pat. No. 5,494,219. This patent presents a method for controlling opening and closing coils of a dual coil fuel injector. The opening and closing coils are used to create electromagnets that may be made to open and close the fuel injector during engine operation. An injector opening cycle is described by a sequence where current is supplied to the closing coil before current is applied to the opening coil. Current is applied to the closing coil with the objective of overcoming residual magnetism that remains in the closing electromagnet core. By attempting to overcome the residual magnetism, the method seeks to negate the latching effect that the residual magnetism provides between the electromagnet and the armature.

The above method also has several disadvantages. For example, the current profile that is delivered to the opening coil for the purpose of overcoming the residual magnetism of the electromagnet is constant from operating cycle to operating cycle and equivalent between different fuel injectors. However, the amount of residual magnetism present within a group of magnet cores can vary with operating conditions, manufacturing variations, and past operating history. Consequently, the method's constant current profile, which is intended to counter the residual magnetic force left in the closing electromagnet, will likely cause the closing electromagnet to produce a counter magnetic force that does not properly cancel the residual magnetism. In other words, the closing electromagnet can retain its residual magnetism and latching capacity, which will have to be overcome by the magnetic field generated by the opening electromagnet if the actuator is to change its operating state. To counteract this imbalance, the opening electromagnet magnetic field may be strengthened by increasing current flow to the electromagnet; however, additional current supplied to the opening coil may cause coil degradation during some conditions and would require a valve controller having a higher current capacity. In addition, when operating at colder operating temperatures, friction between the actuator armature and the armature guiding surfaces can increase such that still additional current may be needed to change the actuator state. And since the method does not have the capacity to precisely counteract the residual magnetism, current may have to be increased in the opening electromagnet to overcome the remaining residual magnetism as well as the increased friction. These conditions may increase the possibility of opening coil degradation if the opening coil is used to overcome both the residual magnetism and the friction forces.

SUMMARY

One embodiment of the present description includes a method for improving the operation of a dual coil electrically controlled actuator, the method comprising: demagnetizing a core of a first electromagnet; and increasing the magnetization of a second electromagnet to actuate said dual coil electrically controlled actuator during or after demagnetizing said core of said first electromagnet. This system and method overcome at least some of the limitations of the previously mentioned method.

By demagnetizing the core of a first electromagnet of a dual coil electromagnetic actuator, residual magnetism in the first electromagnet can be removed so that the latching function of the actuator does not have to be overcome by increasing current to the actuator's second electromagnet. For example, a dormant electrical actuator configured to influence the operation of an internal combustion engine may be reactivated and caused to change operating state by demagnetizing the core of a first electromagnet and initiating the flow of current into a coil of a second electromagnet. Demagnetizing the core of the first electromagnet can reduce the amount of current that is used by a second electromagnet to change the actuator operating state. And since the electromagnet is demagnetized, the level of current applied to the first electromagnet to cancel the residual magnetism does not have to be estimated or varied. Rather, current flow to the first electromagnet may be stopped while the second electromagnet is made active since the first electromagnet provides little or no attractive force to the actuator armature. Further, since the first electromagnet is demagnetized, the current delivered to the second electromagnet can be simply based on the friction dependant armature losses, viscous losses, and the energy necessary to move the armature. That is, excess current supplied to the second electromagnet can be reduced or limited, thereby reducing the possibility of coil degradation in the actuator.

The present description can provide several advantages. Specifically, the magnetic force produced by a coil of a dual coil electrically controlled actuator may be better utilized. For example, more of the magnetic force generated by an electromagnet can be used to overcome friction forces within the actuator rather than canceling residual magnetism. Further, since it is not necessary to estimate residual magnetism in the first electromagnet, a better estimate of the amount of magnetic force needed to move the actuator armature can be made so that the actuator operating state may be changed more reliably and without increasing actuator current usage. Further still, demagnetization of one electromagnet of a dual coil electrically controlled actuator does not have to be specifically linked to the operation of a second electromagnet. That is, since demagnetization removes residual magnetism, demagnetization can remove the force opposing a second electromagnet without having to energize the first electromagnet in synchronism with the second electromagnet is energized.

The above advantages and other advantages, and features of the present description will be readily apparent from the following detailed description of the preferred embodiments when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
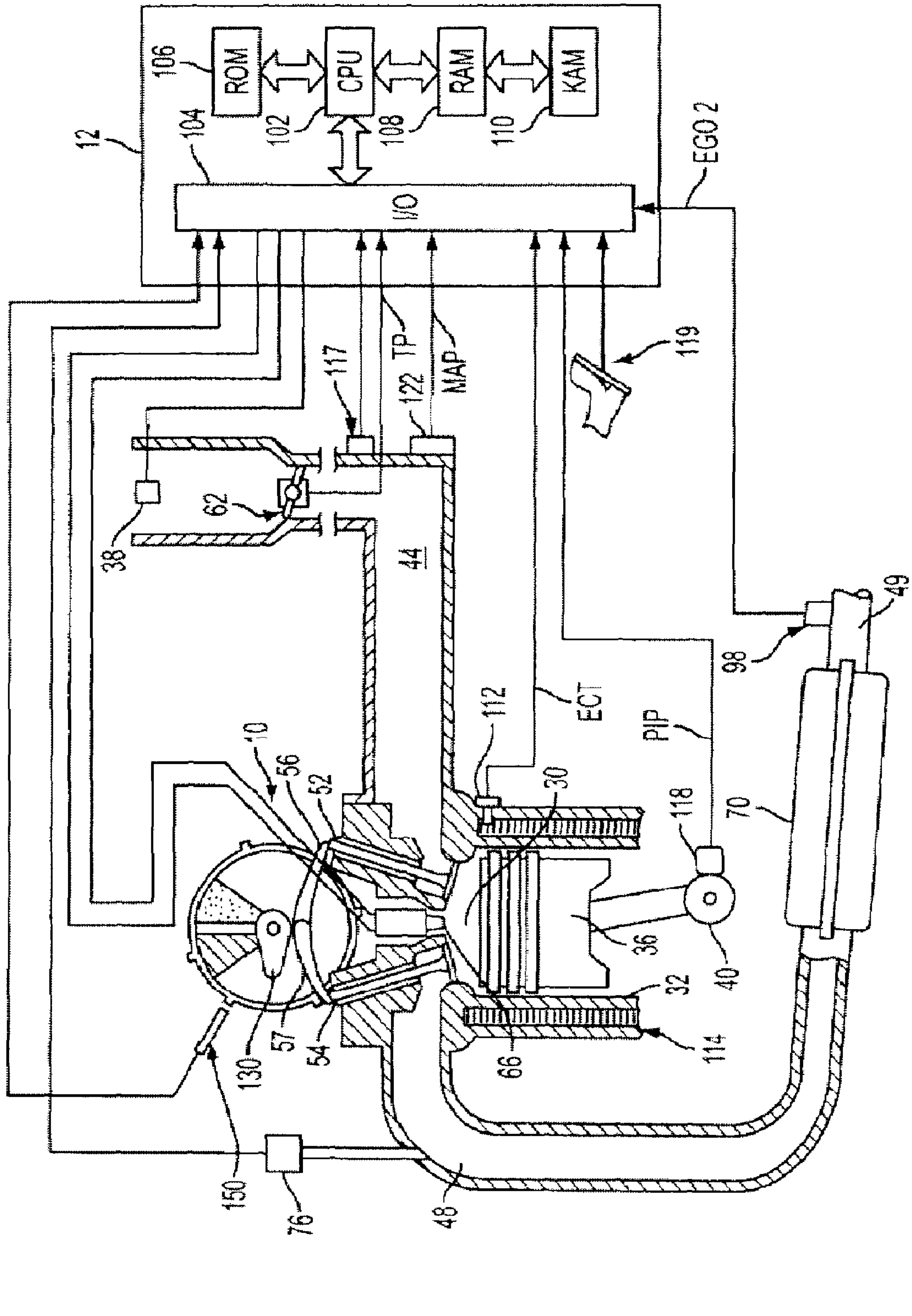
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is shown communicating with optional electronic throttle 62.

Fuel is directly injected into combustion chamber 30 via fuel injector 66. The fuel injector is an example of an electrically operable mechanical valve. Fuel injector 66 receives opening and closing signals from controller 12. The injector control signals may be current or voltage based demands. That is, controller 12 may be designed to regulate current or voltage that is supplied to fuel injector 66. Camshaft 130 is constructed with at least one intake cam lobe profile and at least one exhaust cam lobe profile. Alternatively, the intake cam may have more than one lobe profile that may have different lift amounts, different durations, and may be phased differently (i.e., the cam lobes may vary in size and in orientation with respect to one another). In yet another alternative, the system may utilize separate intake and exhaust cams. Cam position sensor 150 provides cam position information to controller 12. Intake valve rocker arm 56 and exhaust valve rocker arm 57 transfer valve opening force from camshaft 130 to the respective valve stems. Intake rocker arm 56 may include a lost motion member for selectively switching between lower and higher lift cam lobe profiles, if desired. Alternatively, different valvetrain actuators and designs may be used in place of the design shown (e.g., pushrod instead of over-head cam, electromechanical instead of hydro-mechanical).

Fuel is delivered to fuel injector 66 by a fuel system (not shown) including a fuel tank, fuel pump, and fuel rail (not shown). Engine 10 may be designed to operate on one or more fuel types such as diesel, gasoline, alcohol, or hydrogen.

A distributorless ignition system (not shown) may provide ignition spark to combustion chamber 30 via a spark plug (not shown) in response to controller 12. Universal Exhaust Gas Oxygen (UEGO) sensor 76 is shown coupled to exhaust manifold 48 upstream of catalytic converter 70. Two-state exhaust gas oxygen sensor 98 is shown coupled to exhaust pipe 49 downstream of catalytic converter 70. Converter 70 may include multiple catalyst bricks, particulate filters, and/or exhaust gas trapping devices.

Controller 12 is shown in FIG. 1 as a conventional microcomputer including: microprocessor unit 102, input/output ports 104, read-only memory 106, random-access memory 108, keep-alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; engine knock sensor (not shown); fuel type sensor (not shown); ambient air temperature sensor 38; a measurement (ACT) of engine air temperature or manifold temperature from temperature sensor 117; and an engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Figure 2B:
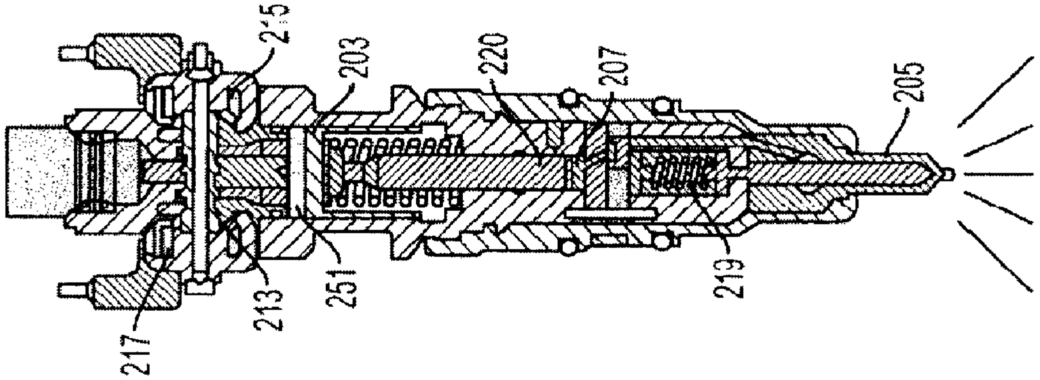
FIG. 2B is a cross-section schematic of an example electrically operated mechanical valve in an open position.
Figure 2A:
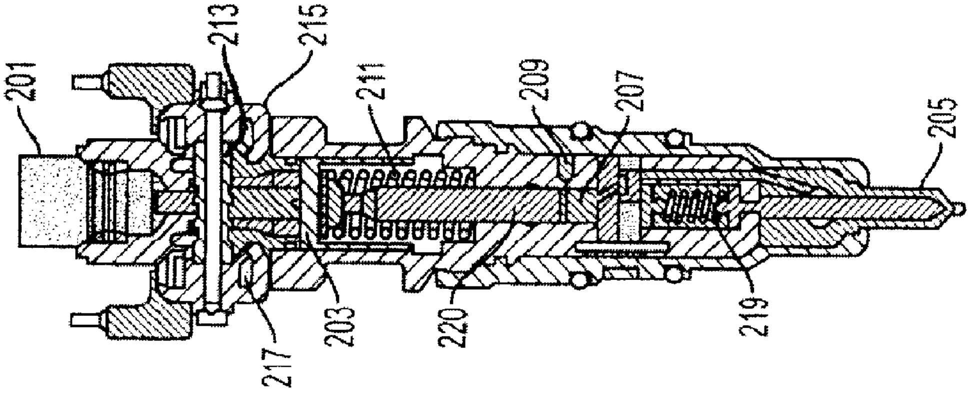
FIG. 2A is a cross-section schematic of an example electrically operated mechanical valve in a closed position.

Referring now to FIG. 2A, a cross-section schematic of an example electrically operable mechanical actuator is shown. In particular, a fuel injector in the closed position is shown. Oil enters the fuel injector at port 201. The position of spool valve 213 controls the flow of working oil through the injector. Opening coil 217 is used to open spool valve 213 and closing coil 215 is used to close spool valve 213. The opening and closing coils are wrapped around a ferrous metal core to produce electromagnets. The electromagnets (i.e., the coils and cores) are placed at the ends of the spool valve guide to form end-caps of the spool valve actuator assembly. In the open position, the spool valve allows the oil to intensify or increase the fuel pressure. In the closed position, the spool valve allows oil to flow from the intensifier and decrease the fuel pressure. Return spring 211 acts against the oil pressure via piston 203 and forces oil out of the injector when spool valve 213 is in the closed position. Fuel is fed into the injector via port 209 and is acted upon by intensifier piston 220 in chamber 207. When the fuel pressure reaches a predetermined level, pintle 205 opens and fuel is discharged to combustion chamber 30. When the fuel pressure lowers, spring 219 returns the pintle to the closed position and fuel flow stops.

Referring now to FIG. 2B, a cross-section schematic of an example fuel injector in the open position is shown. The figure shows the working oil displacing volume 251 above piston 203. This causes intensifier piston 220 to apply pressure to intensifier chamber 207, thereby reducing the intensifier chamber volume and increasing the fuel pressure. The fuel pressure overcomes the force of spring 219 and opens pintle 205 releasing fuel into the combustion chamber. Note that spool valve 213 is positioned against the pole face of coil 215 while it is positioned against the pole face of coil 217 in FIG. 2A.

Note that other electrical actuator designs are contemplated so that the specific characteristics of the actuator depicted in FIGS. 2A and 2B are not meant to limit the breadth or scope of this disclosure. For example, a partial non-limiting list of electrically controlled actuators includes: fuel injectors, cylinder valve actuators, and vapor management valves.

Figure 3:
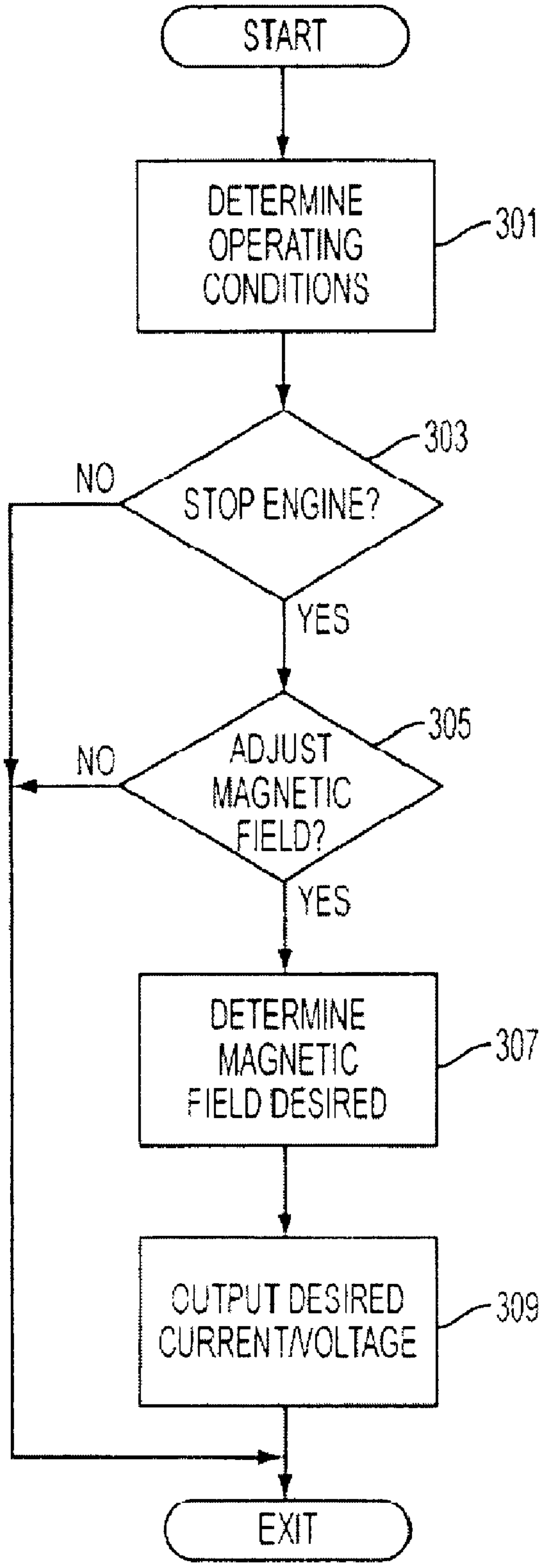
FIG. 3 is a flow chart of an example strategy for reducing residual magnetism of an electrically controlled actuator.

Referring now to FIG. 3, a flow chart of an example strategy for reducing the residual magnetism of an electrically controlled actuator is shown.

Operation and control of an electrically controlled actuator can be affected by residual magnetism. For example, residual magnetism present in an electromagnet core/end-cap can attract an actuator's internal movable components, such as a spool valve, toward the core/end-cap at times when such an attraction is undesirable. The residual magnetism may be the result of exposing ferrous metal actuator components to the magnetic field that is created by flowing current through a coil. That is, some of the magnetic properties can be retained in the electromagnet's core/end-cap and/or the spool valve, even though there may be no current flowing though the electromagnet's coil. This may create both desirable and undesirable conditions. For example, the residual magnetism can have a latching effect that keeps an actuator from changing state when power is not being supplied to the actuator. As a result, the residual magnetism gives the actuator predictable behavior during these periods. However, the residual magnetism can also increase the force that is necessary to change the state of the actuator armature when the actuator is restarted. This may be undesirable during cold operating conditions when the viscous forces between the armature and the valve body oppose motion of the armature. Consequently, current may have to be increased to the coil that is opposite the resting armature state (e.g. if the armature is in the closed state current to the opening coil may be increased) to restart the armature in motion. And increasing the coil current required additional power and can increase coil degradation, at least during some conditions. Therefore, it is desirable to have the ability to selectively change the amount of residual magnetism in an electrically controlled actuator.

In one embodiment, a dual coil electrically controlled actuator is operated by supplying current to an opening coil and to a closing coil at different times. The current passes through a coil and creates an electromagnet that projects a magnetic field in the vicinity of a spool valve. The magnetic field changes magnetic domains within the spool valve and causes the spool valve to be attracted to the electromagnet. In this way, the spool valve can be shuttled between an open position and a closed position, thereby altering the flow path through the actuator and operating the actuator. When the actuator is stopped, the spool valve takes the open or closed position and is proximate to the respective coil, typically near the closing coil. Residual magnetism within the closing coil keeps the spool valve or armature in the closed position.

If desired, however, the residual magnetism may be selectively reduced, thereby lowering the self latching magnetic forces in the electrical actuator. This may be desirable at lower temperatures where oil viscosity will increase around the spool valve, so that the oil can help to keep the spool valve stationary even when the residual magnetism is reduced.

One method to reduce residual magnetism of a ferrous metal is to mechanically strike the ferrous metal with another object. When the metal is struck, the impact tends to disturb the aligned magnetic domains, thereby demagnetizing the component. And, the greater the impact force, the fewer aligned magnetic domains will remain. Thus, an electromagnet can be selectively demagnetized by striking the electromagnet's core/end-cap in the absence of a magnetic field. Demagnetizing at least one of the actuator coils can permit an electrically controlled actuator to be restarted using less current, at least during some conditions.

Returning to FIG. 3, in step 301, engine and actuator operating conditions are determined. Engine operating conditions can be determined by sampling various sensors that are located in and around an internal combustion engine. For example, engine coolant temperature, ambient air temperature, engine speed, and engine load may be determined by controller 12 sampling the outputs of sensors 112, 118, 119, and 38 illustrated in FIG. 1. Further, additional engine operating conditions may be determined from sensors and actuators that are known but not illustrated in FIG. 1, engine oil temperature for example. The operating conditions of electrical actuators may be determined by sensors that are exposed to actuator conditions. For example, a temperature sensor that measures the out-side temperature of an actuator coil, or a sensor the measures armature position. On the other hand, it is also possible to infer actuator and engine operating conditions using sensor data and from data that is available to controller 12. For example, controller 12 can capture the last time that the engine was operated and use this information along with the current engine temperature to infer the temperature of an electrical actuator. After engine and actuator operating conditions are determined, the procedure continues to step 303.

In step 303, the routine determines if the engine is operating and if an engine stop is requested. If the engine is operating and an engine stop is requested, the routine proceeds to step 305. If the engine is not operating, or if an engine stop is not requested, the routine proceeds to exit.

Note that it is also possible to change the logic of step 303 so that the routine exits unless the engine is stopped or nearly stopped (e.g., less than 200 RPM). This logic would cause the demagnetization operation to occur after an engine stop, rather than during the engine stop process.

In step 305, the routine determines whether or not to adjust one or more magnetic fields that are produced during operation of an electrical actuator. During some operating conditions, it may be desirable to change the way a magnetic field develops or decays when a current is applied to a coil. In other operating conditions, it may be desirable to simply control when a voltage/current is applied or disconnected from a coil. If a field is desired that can be used to reduce residual magnetism in the coil, the routine proceeds to step 307. If reduction in coil residual magnetism is not desired the routine proceeds to exit.

In step 307, the routine determines the current/voltage to produce the desired field strength and duration that can be used to reduce core/end-cap residual magnetism. By adjusting current supplied to the electrical actuator, the actuator can be controlled such that the magnetic field draws the armature toward the core/end-cap and then decays before the armature impacts the core/end-cap. That is, the current can be reduced so that the magnetic field reduces in the period of time where the armature/spool is moving from a first position to a second position near the core/end cap. As a result, the armature impacts the core/end-cap and reduces residual magnetism in the core/end-cap and armature. In one example, the armature is accelerated from a first state and then the field is reduced without substantially reducing the armature velocity (i.e., the armature reaches a velocity and this velocity is not actively reduced by applying a magnetic force, rather the armature velocity is simply reduced, if at all, by parasitic losses in the actuator) so that the armature impacts the core/end-cap at a raised velocity, but in the absence or substantially reduced (i.e., a magnetic field strength that allows the magnetic domains of the core/end-cap to be realigned by mechanical impact, of course the specific field strength will vary with core material) of a magnetic field. This method allows the armature state to change in the same operation as where the residual magnetism of an electromagnet is reduced. Further, the actuator can be set to the closed position with a lower level of residual magnetism during an electrical actuator stop sequence, for example. Consequently, when the actuator is restarted from the closed position to the open position, less actuator current may be required. In addition, it is also possible to vary the magnetic field in response to engine operating conditions or in response to electrical actuator operating conditions, such that the armature impact force is regulated. In other words, current or voltage profiles delivered to the electrically controlled actuator may be varied as operating conditions vary so that the amount of demagnetization is controlled over a range of operating conditions.

Note that it is possible to alter the magnetic field in a variety of ways so that the desired level of demagnetization occurs. For example, while an internal combustion engine is operating, voltage applied to close a fuel injector may be 24 volts for 2 milliseconds. On the other hand, after a request has been made to stop the internal combustion engine, the same 24 volt command may be reduced to 200 microseconds, for example. In another example, the voltage command may be increased to 42 volts and having a 100 microsecond duration, for example. And since electrically controlled actuators can be designed in different ways, the amount and duration of current/voltage commands can vary with specific applications. Further, the impact between the armature/spool and the core/end-cap can cause the armature/spool to bounce up against the core/end-cap. Current can be reduced to the attracting coil before the bouncing ceases so that multiple impacts between the armature and the core can be used to demagnetize the core while there is a weakened or absent field. In one embodiment, the current is reduced between the time of the first impact and the final impact.

The desired magnetic field profile is produced by adjusting the profile of current/voltage that is supplied to the electrically controlled actuator. When the actuator is to be mechanically demagnetized, engine and valve operating conditions are used to index a series of functions and/or tables that express a time based current/voltage command. The current/voltage command can be varied by changing values stored in the tables and/or functions. The desired current profile is extracted from the memory of controller 12, FIG. 1, and then the routine proceeds to step 309.

In step 309, the current/voltage commands are output to the electrically controlled actuator. In one example, the actuator commands are timed and output in synchronism with engine position. That is, the current/voltage is applied to an electrically controlled actuator so that an event created by operating the actuator occurs at a desired engine position. For example, an actuator current profile can be sent to a dual coil electrically actuated fuel injector so that fuel is injected to a cylinder at an engine position that facilitates fuel combustion. Specifically, the fuel injector opening coil for cylinder number one could be activated at 175° before top-dead-center of a cylinder one compression stroke, and then the opening coil is deactivated after 20 milliseconds at which time the injector closing coil is activated in a way that causes the spool valve to strike the core/end-cap when little or no magnetic field is present. In this way, fuel can be injected to a cylinder for a last combustion event before the engine is stopped, while in the same sequence residual magnetism in the fuel injector is reduced. The routine exits after outputting the actuator control command.

Figure 4:
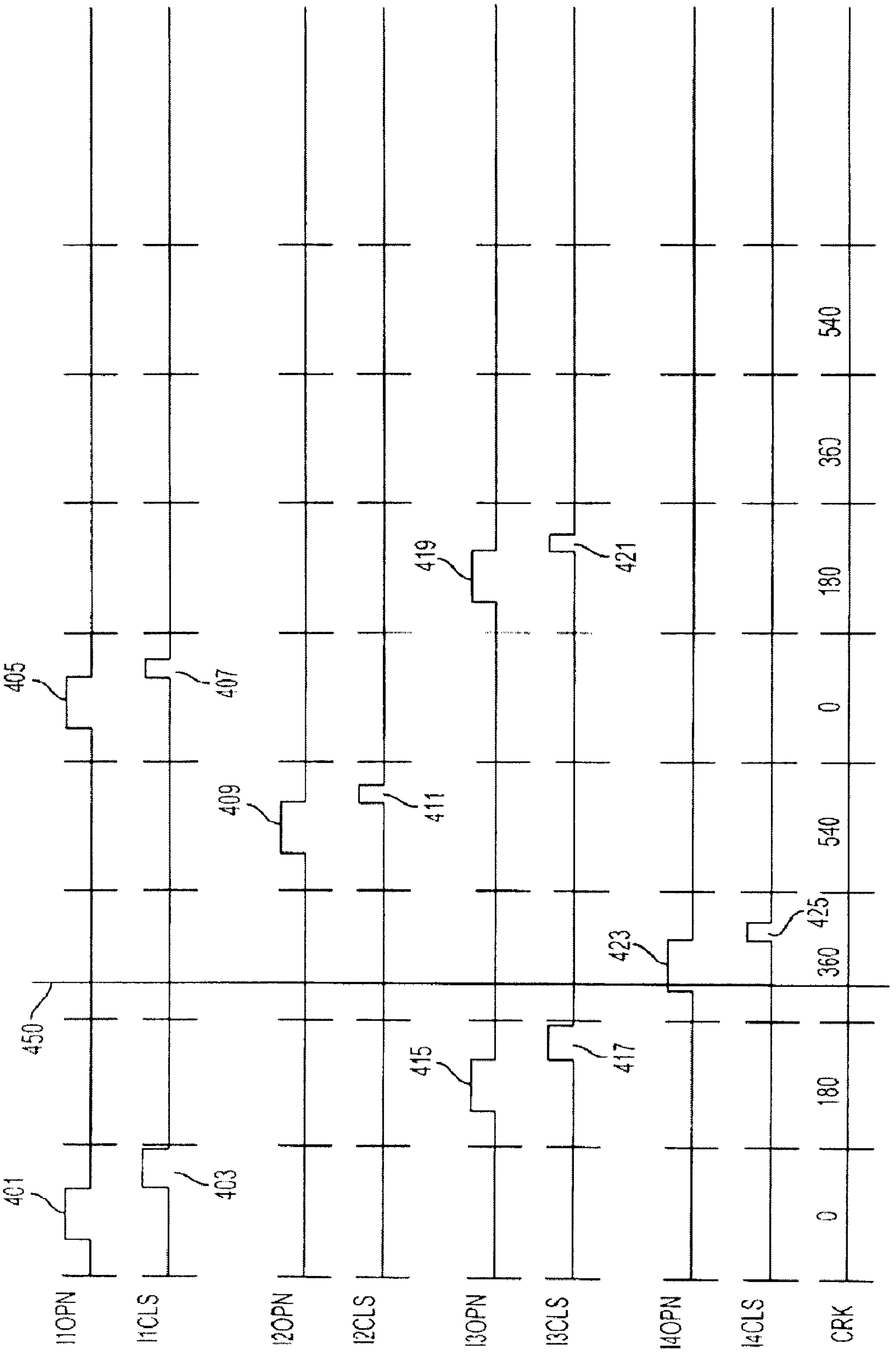
FIG. 4 is a plot of example control signals that are delivered to an electrically controlled actuator.

Referring now to FIG. 4, a timing sequence for improving injector operation during an example simulated engine stopping sequence is shown. This sequence may be generated by the method described in FIG. 3, for example. Note that FIG. 4 is a single illustration that depicts a single demagnetization sequence, but that variants are anticipated wherein the order of the sequence may be varied, the number of engine cylinder may be varied, and the timing and/or duration of specific control commands may also be varied without departing from the intent or scope of this disclosure.

The sequence flows from left to right and illustrates injector command signals for a four cylinder engine. The fuel injector command signals are labeled on the left side of the figure. An engine position reference is provided by the trace labeled CRK which represents engine position referenced to cylinder one top-dead-center of compression stroke. That is, the numerals next to the trace represent engine position at the vertical marker to the right of the numeral, reference to top-dead-center of cylinder one compression stroke.

Label I1OPN identifies command signals that are sent to the opening coil of injector one. I1CLS is a label that identifies cylinder number one injector command signals that are sent to the closing coil of injector one. Commands for injectors 2-4 follow similar naming conventions. A high level indicates commands are sent to the coil during the period where the signal is high. Control commands may be voltage or current based depending on the design of the regulating controller, and as such, the signals shown in the figure are simply meant for illustration purposes. For example, label 401 identifies an interval where a command is sent to the opening coil of injector one before the engine stops. Likewise, label 403 identifies an interval where a command is sent to the injector one closing coil.

During the period between the onset of the command at 401 and the command at 403, fuel is delivered to a cylinder of an internal combustion engine. Fuel pressure in the injector begins to increase while the opening coil has captured the spool valve in the open position. Fuel is injected to a cylinder when the pressure reaches a level that overcomes the nozzle spring force. Fuel flow to the cylinder is stopped shortly after the closing coil is commanded at 403, see FIGS. 2A and 2B for a detailed description of operation. The command duration at 403 is such that the spool valve is drawn toward the closing coil and captured in place by retaining the magnetic field at a higher intensity. Maintaining the field at a higher intensity reduces any bouncing of the armature that may occur as a result of the armature impacting the core/end-cap. The bounce can be reduced because the armature remains in a strong magnetic field until the armature comes to rest.

Vertical marker 450 represents the timing of an engine stop request relative to engine position. Note that this location was arbitrarily selected and is therefore not meant to limit the scope or breadth of this disclosure. Injector command signals to the left of marker 450, namely, commands 401, 403, 415, and 417 represent nominal injector control commands before a request to stop the engine. Of course, different timings are possible than those illustrated in the figure, and the benefits described herein will apply to those timings as well.

Injector command signals to the right of marker 450, specifically commands 405, 407, 409, 411, 419, 421, 423, and 425 represent injector opening and closing commands after a requested engine stop. Notice that the duration of injector closing commands 407, 411, 421, and 425 are reduced when compared to closing coil commands that were issued prior to the engine stop request (i.e., 403 and 417). By reducing the command duration, the duration of the magnetic field can be reduced so that the armature can impact the core/end-cap when the current induced magnetic field strength is low or zero. And as described above, the armature impacting the core/end-cap can redistribute the aligned magnetic domains so that the residual magnetism in the core/end-cap and armature is reduced. Post engine stop request injector opening commands 405, 409, 419, and 423 are shown having the same duration as pre engine stop request injector opening commands 403 and 415. However, the injector opening commands can be adjusted as well, if desired. In one example, the injector opening commands can be reduced so that less engine torque is produced by the last set of fuel injections. In the example illustrated in FIG. 4, each fuel injector is cycled (i.e., opened and closed) one time after the request to stop.

Note that the injector closing commands that follow and engine stop request are not required to conform to the profile illustrated by commands 407, 411, 421, and 425. More complex profiles may be applied where time and computational power permit. Complex profiles may further increase the level of demagnetization.

Figure 5:
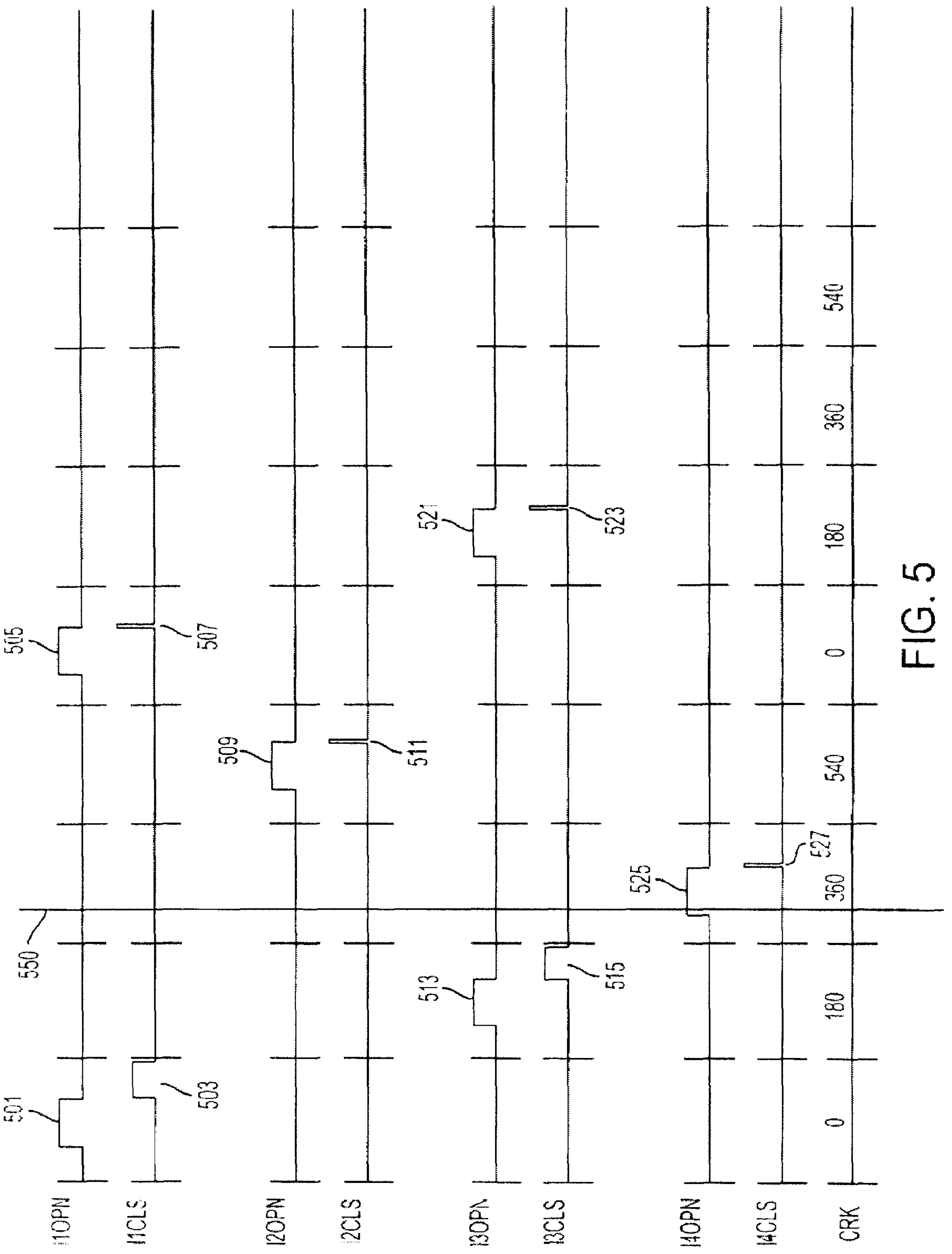
FIG. 5 is another plot of example control signals that are delivered to an electrically controlled actuator.

Referring now to FIG. 5, an alternative simulated mechanical demagnetization is shown. The signals illustrate in FIG. 5 follow the same naming convention and pattern as those described in FIG. 4. Again, fuel injector signals for a four cylinder engine are illustrated. And similar to FIG. 4, the control commands may be voltage or current based depending on the design of the regulating controller, and as such, the signals shown in the figure are simply meant for illustration purposes.

Injector command signals to the left of engine stop request marker, 550, are signals that represent injector commands during nominal conditions, at idle for example. In particular, opening coil commands 501 and 513 represent commands sent to the opening coil of cylinder one and three fuel injectors, while 503 and 515 represent command signals sent to the closing coils of the respective injectors. On the other hand, command signals to the right of engine stop request marker 550 represent injector command signals that alter the magnetic field strength so that the armature can impact the core/end-cap to mechanically demagnetize the core/end-cap and armature. Specifically, 505, 509, 521, and 525 represent injector opening command signals while 507, 511, 523, and 527 represent injector closing commands. These injector closing commands differ from the injector closing commands illustrated in FIG. 4 in that they show an alternate way to construct a magnetic field during the mechanical demagnetization process. In particular, the injector closing commands exhibit a higher level and shorter duration than those in FIG. 5. Thus, the magnetic field strength is increased at the beginning of the closing event, and the field duration is reduced earlier in the closing event. This example can increase the initial spool valve velocity and decrease the magnetic field strength during the impact event. Consequently, this profile may further reduce residual magnetism in the core/end-cap and spool valve.

Of course, different timings are possible than those illustrated in the figure, and the benefits described herein will apply to those timings as well. Further, more complex current/voltage command profiles are also anticipated and so the scope and breadth of the present description is not limited to those illustrated in FIG. 5.

Figure 6:
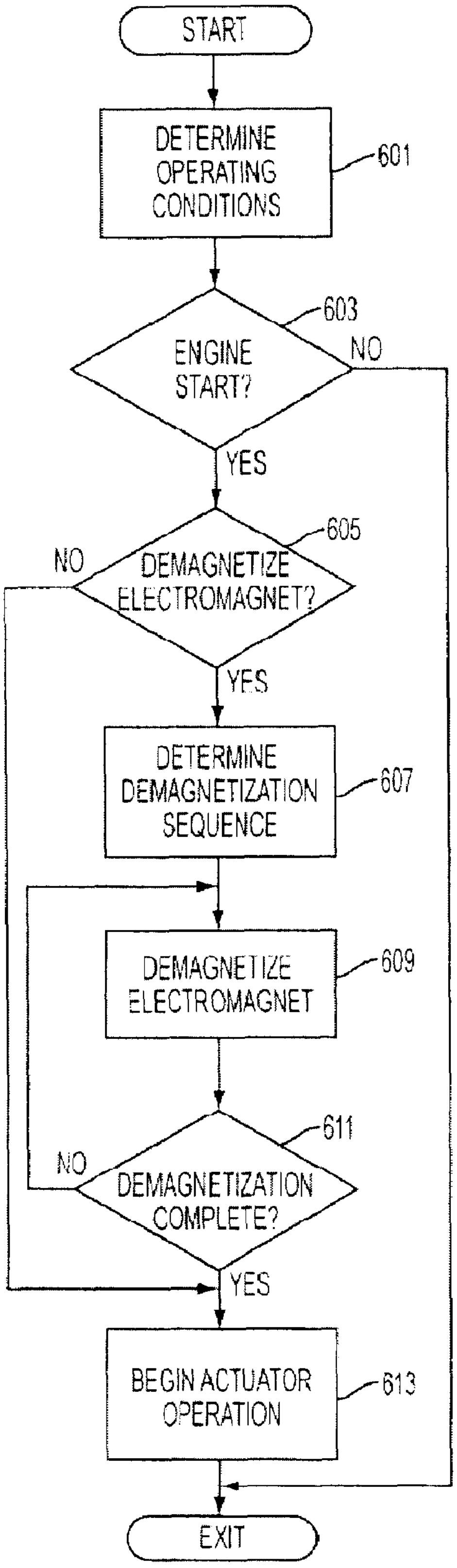
FIG. 6 is a flow chart of an example routine for electrically demagnetizing an electrically controlled actuator.

Referring now to FIG. 6, an example flow chart for an electrical demagnetization of an electrically controlled actuator method is shown. The routine may be used to demagnetize one or more electrically controlled actuators. For example, all engine fuel injectors may be demagnetized, if desired. Alternatively, a single fuel injector may be demagnetized, if desired.

In step 601, engine and electrical actuator operating conditions are determined. Engine operating conditions may include engine speed, ambient air temperature, engine coolant temperature, engine oil temperature, and/or other conditions that can be used to determine if actuator demagnetization is desirable. Electric actuator operating conditions, such as actuator temperature, time since last operation, and/or other conditions are also determined in step 601. The routine then proceeds to step 603.

In step 603, the routine determines if an engine start is requested. If an engine start has been requested the routine proceeds to step 605. If not, the routine proceeds to exit. Note that an engine start request may be initiated by a driver/operator or by an external system such as a hybrid vehicle controller.

In step 605, the routine determines whether or not to demagnetize the actuator core/end-cap. By evaluating the engine and actuator parameters determined in step 601, the routine can decide if demagnetization is desirable. In one example, the demagnetization strategy is based, at least in part, on ambient air temperature and engine coolant temperature. In this example, an empirically based model uses this information to infer the temperature of an electrical actuator and to determine if demagnetization would be useful during an actuator restart. In another example, a direct measurement of the actuator coil temperature can be used to determine if actuator demagnetization is desirable during a start. In this example, the decision to demagnetize the core/end-cap is, at least in part, a function of actuator coil temperature. At lower actuator coil temperatures, the closing electromagnet is demagnetized so that less magnetic force is required by the opening magnet to open the electrically actuated valve. Thus, there can be a first starting mode, where at a lower temperature, the electrically controlled actuator is demagnetized, and a second mode where, at a higher temperature, the actuator is not demagnetized.

In step 605, the routine can also link the demagnetization process with an engine initialization period or event. For example, in diesel applications, there is an initial period where engine glow plugs heat cylinders to improve engine starting. During this initialization period, the operator is signaled to refrain from starting the engine so that the cylinder temperature reaches a desired level. If the operator attempts to start the engine before the predetermined time, the glow plugs can be deactivated. In some circumstances, this initialization period provides a good opportunity to demagnetize electrical actuators. For example, dual coil fuel injectors can be demagnetized during this time interval so that the injectors start more predictably. That is, by demagnetizing engine fuel injectors, the amount of fuel delivered to an engine during a start can be made more repeatable since spool valve movement may be more predictable when the opening coil does not have to overcome residual magnetic forces. If the operator attempts to start the engine during the initialization period, the demagnetization process can be interrupted and the routine exits. If the routine chooses to demagnetize the electromagnet, it proceeds to step 609. Otherwise, the routine proceeds to step 613.

In step 607, the routine determines the demagnetization sequence. An electrical actuator may be operated over a variety of conditions, and as such, the magnetic field used to operate the actuator may be varied to account for this change over the operating range. Demagnetization current/voltage profiles are stored in memory of controller 12, FIG. 1, and are retrieved upon a determination that demagnetization is desired. The profiles define the output current/voltage that is delivered to the electrical actuator being demagnetized as a function of time. Profiles are comprised of segments that describe voltage/current output during predetermined time intervals. For example, a demagnetization sequence might be described by the following profile segments: forty segments that produce a sinusoid that decays from two amps to zero amps in four seconds. Note that this example describes forty separate profile segments, but more or fewer segments may be used to describe a particular desired demagnetization cycle. Specific profiles are determined by evaluating operating conditions from step 601. Specifically, operating conditions are used to index tables and/or functions that describe particular segments of a demagnetization procedure. As operating conditions vary, different current/voltage profiles can be substituted within a demagnetization profile. After determining the demagnetization sequence the routine proceeds to step 609.

In step 609, the routine demagnetizes the electromagnet core/end-cap. As mentioned above, a dual coil electrically controlled actuator is operated by passing current through opening and closing coils at different times. During actuator operation, current is passed through a coil in a forward direction and produces a magnetic field. The magnetic field causes magnetic domains in the core/end-cap to align consistently with the magnetic field direction. Over time, some of these magnetic domains may remain aligned in the direction of the magnetic field, even when current is not flowing through the coil. These aligned domains act together and form residual magnetism within the core/end-cap.

During demagnetization, current is input to the coil in the reverse direction. As a result, the magnetic field direction is changed and the domains that have aligned in the direction consistent with forward current magnetic field are redistributed, thereby demagnetizing the core/end-cap. In addition, the demagnetization process can be improved by applying a time-varying decaying reverse current to the coil. A time-varying decaying current can cause the core/end-cap material to alternate between the first and third quadrants of the core material B-H curve. The current is initially commenced at a higher level to redistribute the magnetic domains that became aligned from the forward current. The current decays in amplitude and allows the magnetic field to redistribute remaining aligned magnetic domains while reducing the possibility that these magnetic domains will settle into an alternative alignment.

The demagnetization process follows the profile that was determined in step 607. In accordance with the desired profile, controller 12 outputs current/voltage to one or more electrical actuators. The electrical actuators may be demagnetized simultaneously or they may be sequentially demagnetized. Sequential demagnetization offers the possibility of reducing peak current demand, but it also potentially increases the demagnetization time. Further, the demagnetization process can be accomplished such that fuel is not injected while the actuator is being demagnetized. The routine proceeds to step 611.

In step 611, the routine determines if the complete demagnetization profile has been executed or if there has been an external request to stop the demagnetization process. If the demagnetization profile has not been completed and if there is no external request to stop demagnetization, the routine returns to step 609 and continues to output the desired demagnetization profile. If the demagnetization profile has executed or if there is an external request to stop the demagnetization process, the routine proceeds to step 613.

In step 613, operation of the electrically controlled actuator is initiated. The actuator may be started by simply energizing an opening coil to initiate armature movement. Alternatively, a closing coil may be energized, depending on system configuration. In a case where a dual coil actuator is being started, a voltage or current may be sent to a first coil so that an armature is pulled toward the first coil. If desired, the second coil of the dual coil actuator can be sent a current in a direction that pushes the armature away from the second coil. For example, the coil can be sent a current that is less than an amount of current that will realign the magnetic domains in the spool valve or armature, but enough to cause the electromagnet to repel the armature/spool valve. This current may be determined from models or empirically. In this way, magnetic forces from the first and second coils may be used to move the armature from its initial state to a second state (e.g., a spool valve can be moved from a closed position to an open position). Thus, the amount of force available to move the armature can be increased. In addition, since the total force can be supplied by two different coils, less current can be supplied to operate each coil than would be necessary if only a single coil were operated to produce equivalent force. After the spool valve changes state, the push-pull operation described above can be discontinued, or if desired, it can be continued for a predetermined number of armature state changes. The electrical actuator can thereafter be operated by using one or more coils to pull the armature/spool valve, thereby magnetizing the demagnetized coil.

It should be noted that an electrically controlled actuator may be demagnetized during or after an engine stop as well. That is, upon an indication that an engine is to be stopped, or has stopped, an electrically controlled actuator can be demagnetized. After the actuator is set to a desired state, open or closed, current flow to the actuator coil can be reversed such that the actuator core/end-cap is demagnetized. In this example, the electrically controlled actuator may be restarted at lower temperature without first demagnetizing the actuator.

Figure 7:
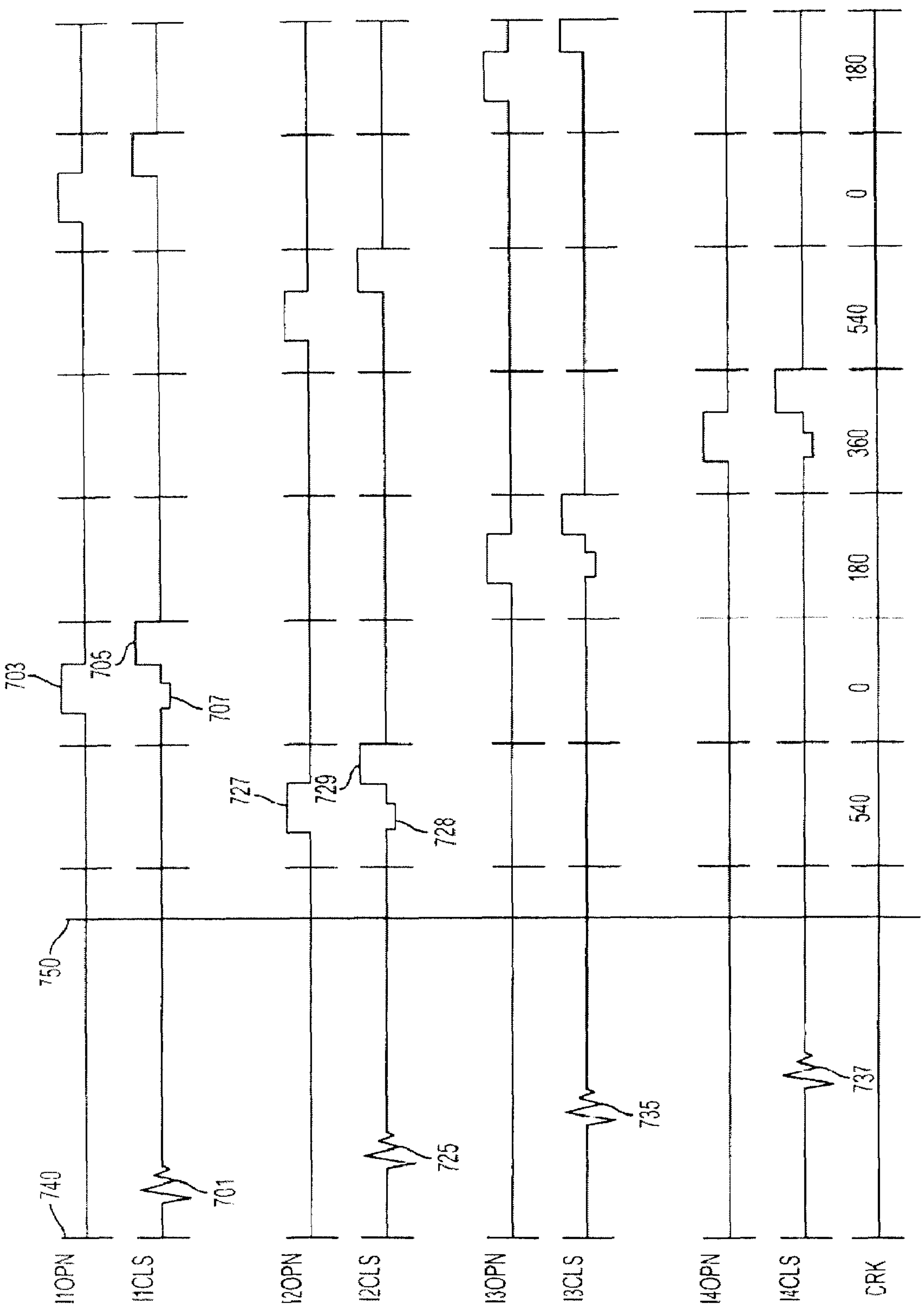
FIG. 7 is a plot of example control signals that are used to electrically demagnetize an electrically controlled actuator.

Referring now to FIG. 7, an example simulated demagnetization process is shown. This particular illustration represents a demagnetization sequence for fuel injectors of a four cylinder engine. Similar to FIGS. 4 and 5, commands to cylinder one fuel injector opening coil are labeled I1OPN and commands to cylinder one fuel injector closing coil are labeled I1CLS. Command signals to injectors 2-4 follow the same labeling convention. Engine crankshaft position, relative to top-dead-center compression stroke of cylinder number one, is illustrated by the trace labeled CRK. The numerical values represent the engine location at the marker to the right of the numeral.

Vertical marker 740 represents a request to start the engine. Shortly thereafter, the closing coil of cylinder number one injector is sent an oscillating current/voltage command, 701, that puts the injector into a demagnetization mode. This current/voltage command swings from negative to positive while at the same time decaying in amplitude. As a result, the core/end-cap ferrous metal is sent through a cycle that traverses the B-H curve of the metal and randomizes the magnetic domains within the metal.

During the initialization period, commands 701, 725, 735, and 737 are sequentially issued so that the peak demagnetization current is reduced. However, the order of demagnetization may proceed in an alternate manner, if desired. And although this illustration shows all four electrically controllable actuators being demagnetized, it is possible to demagnetize a sub-set of the available electrically controllable actuators, if desired.

After each fuel injector is demagnetized, the engine is ready to start and this condition is illustrated by vertical marker 750. Controller 12 may output a signal to the driver or to another engine system at this time so that the remainder of the starting process can be completed. As the engine rotates, fuel is delivered to the respective cylinders by first commanding the opening coil and then commanding the closing coil. In this example, cylinder number two injector is the first injector to deliver fuel. The spool valve is initially commanded open by delivering current/voltage to an opening coil at 727. Shortly thereafter, a reverse current is applied to the closing coil at 728. The reverse current is limited to a predetermined value so that it effectively repels the reverse aligned spool valve magnetic domains. Fuel delivery is stopped when the opening coil is commanded off and when the closing coil is supplied with a forward current at 729.

Fuel is delivered to cylinder one in a similar sequence where cylinder number one fuel injector opening coil is commanded at 703, its closing coil is commanded to reverse current flow and to push the armature at location 707, and the injector is closed at 705 when the closing coil is commanded closed. Notice that the command signals for the closing and opening coils are not maintained at a high level. The residual magnetism in the electromagnet's core provides a spool valve latching force so that current is not needed to preserve the actuator state. Fuel is delivered to the first combustion cycles of cylinders three and four in a similar manner. After each injector operates once in the "push" mode (i.e., where the closing coil pushes the armature while the opening coil pulls the armature) the fuel injectors transition to operation where the spool valve is simply pulled between the opening and closing coils.

Also, note that the signal timings and durations along with the specific order of signals shown in FIG. 7 may change from application to application and were arbitrarily selected to illustrate one example. Therefore, the illustration is not meant to limit the scope or breadth of this disclosure. Further, more complex profiles may be used to demagnetize and/or push the armature away from a core/end-cap.

Figure 8:
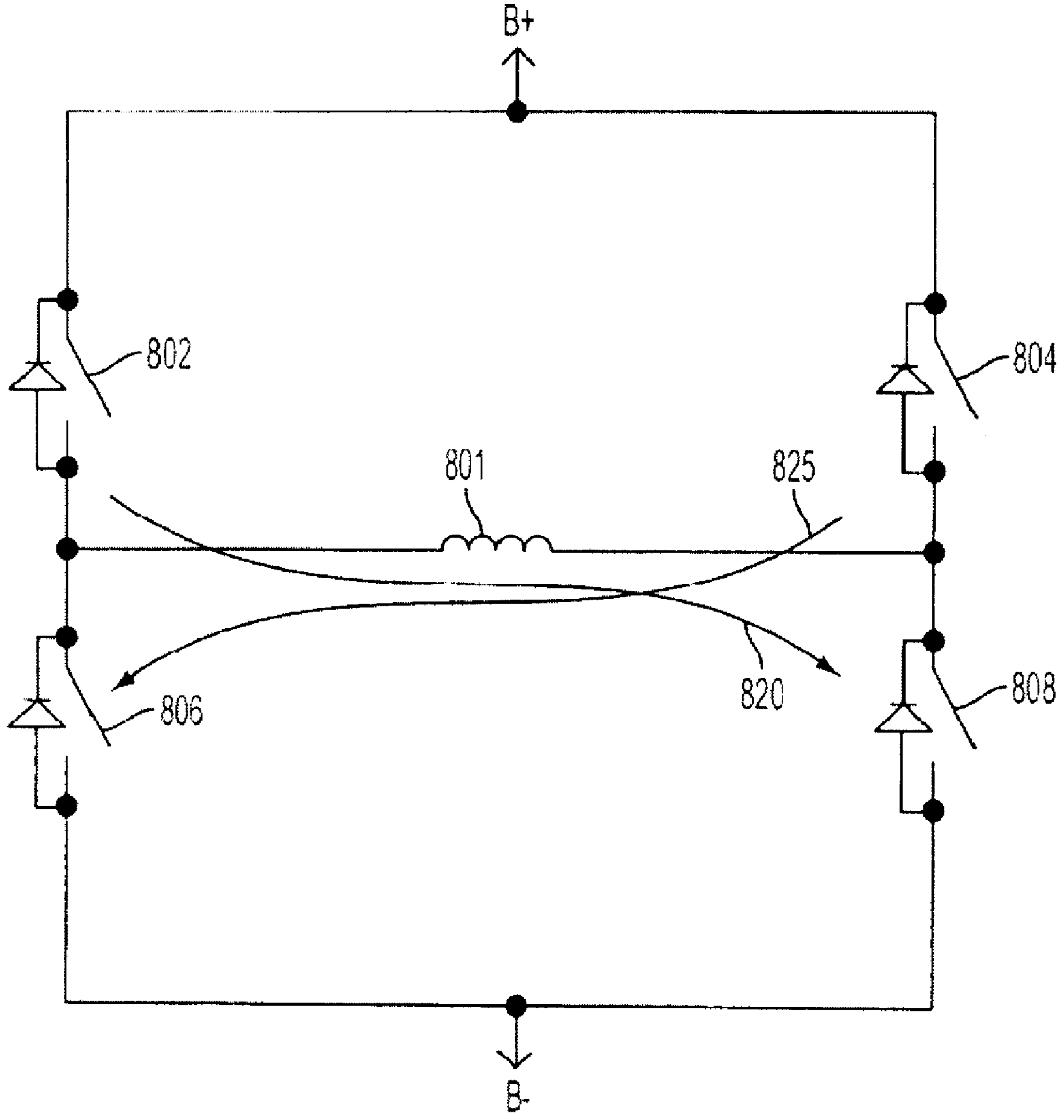
FIG. 8 is an example circuit that can be used to demagnetize an electrically controlled actuator.

Referring now to FIG. 8, an example circuit that can be used to demagnetize an electrically controlled actuator is shown. The circuit is comprised of four switches 802, 804, 806, and 808. The switches can be implemented by transistor, for example, so that current direction may be readily changed. Coil 801 represents a coil of an electrically controlled actuator. An electrically controlled actuator may be comprised of two or more coils for controlling the actuator's armature position. Arrow 820 illustrates a forward current path when the coil is activated in the forward direction. This path is established by closing switches 802 and 808. Arrow 825 illustrates a reverse current path when the coil is activated in the reverse direction. This path is established by closing switches 804 and 806.

This circuit can be used to readily reverse current paths through an actuator coil. Where an actuator has more than one coil, similar circuits can be constructed so that more than one electromagnet may be demagnetized, if desired. In addition, active and passive components may be inserted as desired into either of the current paths to regulate the flow of current through each path.

Note that it is also possible to reverse current flow in an electrically controlled actuator by properly configuring passive devices that charge during operation of the actuator, and then discharge into the actuator when current flow is interrupted, an RLC circuit for example.

As will be appreciated by one of ordinary skill in the art, the routines described in FIGS. 3 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used. And the methods and figures described herein are equally applicable to four, five, six, eight, ten, and twelve cylinder engines.

This concludes the description. The reading of it by those skilled in the art would bring to mind many alterations and modifications without departing from the spirit and the scope of the description. For example, 2-stroke, 4-stroke, I3, I4, I5, V6, V8, V10, and V12 engines operating in natural gas, diesel, gasoline, gaseous fuels, or alternative fuel configurations could use the present description to advantage.

The invention claimed is:

1. A method for improving the operation of a dual coil electrically controlled actuator, the method comprising:

demagnetizing a core of a first electromagnet; and increasing the magnetization of a second electromagnet to actuate said dual coil electrically controlled actuator during or after demagnetizing of said core of said first electromagnet.

2. The method of claim 1 wherein said core of said first electromagnet is demagnetized by reversing the direction of current flowing into a coil of said first electromagnet, compared to the direction that current flowed into said coil the last time an armature of said electrically controlled actuator was attracted to said first electromagnet and when current flowed through said coil.

3. The method of claim 1 wherein the magnetization of said second electromagnet is increased by increasing the flow of current through a coil.

4. The method of claim 1 wherein said electrically controlled actuator is a fuel injector.

5. The method of claim 1 wherein said first electromagnet is a closing magnet and said second electromagnet is an opening magnet.

6. The method of claim 1 further comprising moving an armature of said electrically controlled actuator when magnetization of said second electromagnet is increased.

7. The method of claim 6 wherein said armature is a spool valve.

8. The method of claim 1 further comprising supplying a current to said first electromagnet that pushes said armature away from said first electromagnet when said magnetization of said second coil is increased.

9. A method for improving the operation of a dual coil electrically controlled actuator, the method comprising:

demagnetizing a core of a first electromagnet before or during the start of an internal combustion engine;

increasing the magnetization of a second electromagnet to change the operating state of said dual coil electrically controlled actuator during or after said demagnetizing of said core of said first electromagnet; and changing said operating state of said dual core electrically controlled actuator in synchronism with the operating cycle of said internal combustion engine.

10. The method of claim 9 wherein said dual coil electrically controlled actuator is a fuel injector.

11. The method of claim 10 wherein said fuel injector injects fuel to a cylinder of said internal combustion engine at least once during said operating cycle.

12. The method of claim 9 wherein said first electromagnet is a closing magnet and wherein said second electromagnet is an opening magnet.

13. The method of claim 9 wherein said magnetization of said second coil is increased by increasing a current that is supplied to said second coil.

14. The method of claim 9 wherein said operating state is changed by changing the position of an armature.

15. The method of claim 9 further comprising magnetizing said first electromagnet after demagnetizing said first electromagnet and pushing said armature away from said first electromagnet during at least one of said operating state change.

16. The method of claim 9 further comprising demagnetizing said electromagnet during at least part of an engine start wherein a glow-plug is heating a cylinder.

17. A method for improving the operation of a electrically controlled actuator, the method comprising:

at least partially demagnetizing an electrically controlled actuator by supplying a current to a coil of said electrically controlled actuator, said electrically controlled actuator demagnetized before or after operating said electrically controlled actuator, and said electrically controlled actuator in a configuration to influence the operation of an internal combustion engine.

18. The method of claim 17 wherein said electrically controlled actuator is a fuel injector.

19. The method of claim 17 wherein said electrically controlled actuator is a valve actuator.

20. The method of claim 17 wherein said electrically controlled actuator is a dual coil device.

21. The method of claim 17 wherein said current is supplied by passive electrical components.

22. A computer readable storage medium having stored data representing instructions executable by a computer to control at least an electrically controlled actuator, said storage medium comprising:

instructions for at least partially demagnetizing an electrically controlled actuator by supplying a current to a coil of said electrically controlled actuator, said electrically controlled actuator demagnetized before or after operating said electrically controlled actuator, and said electrically controlled actuator configured to influence the operation of an internal combustion engine by adjusting an amount of fuel supplied to said internal combustion engine.

* * * * *